United States Patent
Halmos

(10) Patent No.: US 10,209,351 B2
(45) Date of Patent: Feb. 19, 2019

(54) NON-UNIFORM SAMPLING FOR UNAMBIGUOUS DOPPLER MEASUREMENT

(71) Applicant: RAYTHEON COMPANY, Waltham, MA (US)

(72) Inventor: Maurice J. Halmos, Encino, CA (US)

(73) Assignee: RAYTHEON COMPANY, Waltham, MA (US)

( * ) Notice: Subject to any disclaimer, the term of this patent is extended or adjusted under 35 U.S.C. 154(b) by 415 days.

(21) Appl. No.: 15/182,423

(22) Filed: Jun. 14, 2016

(65) Prior Publication Data

US 2017/0356984 A1    Dec. 14, 2017

(51) Int. Cl.
*G01S 7/486* (2006.01)
*G01S 17/10* (2006.01)
*G01S 17/58* (2006.01)

(52) U.S. Cl.
CPC ............ *G01S 7/4865* (2013.01); *G01S 17/10* (2013.01); *G01S 17/58* (2013.01)

(58) Field of Classification Search
CPC ......... G01S 7/4865; G01S 17/10; G01S 17/58
See application file for complete search history.

(56) References Cited

U.S. PATENT DOCUMENTS

| 5,745,437 A | 4/1998 | Wachter et al. |
| 7,986,397 B1 * | 7/2011 | Tiemann ................ G01S 17/89 356/5.09 |
| 2015/0177367 A1 * | 6/2015 | Sebastian ............... G01S 7/4814 356/5.09 |

OTHER PUBLICATIONS

Ferreira, "The Stability of a Procedure for the Recovery of Lost Samples in Band Limited Signals," Signal Processing, vol. 40, No. 3, Dec. 1994 (pp. 195-205).
Marks II, "Restoring Lost Samples from an Oversampled Band-Limited Signal," IEEE Trans. Acoustics, Speech and signal Processing, vol. ASSP-31, No. 3, Jun. 1983 (pp. 752-755).
Shannon, "Communication in the Presence of Noise," Proceedings of the IEEE, vol. 86, No. 2, Feb. 1998 (pp. 447-457).
Stark, "Polar, spiral, and Generalized Sampling and Interpolation," Advanced Topics in Shannon Sampling and Interpolation Theory, R.J. marks, II, Ed., New York: Springer-Verlag, 1993 (pp. 185-218).
Mao, et al., "Amplitude-Modulated Laser Radar for Range and Speed Measurement in Car Applications", IEEE Transactions on Intelligent Transportation Systems, IEEE, vol. 13, No. 1 Mar. 2012 (pp. 408-413).

(Continued)

*Primary Examiner* — Eric L Bolda
(74) *Attorney, Agent, or Firm* — Lewis Roca Rothgerber Christie LLP

(57) ABSTRACT

A method for removing Doppler ambiguity in a ladar system. The time of each pulse of a sequence of transmitted pulses is offset from that of a uniform sequence of pulses. Each received pulse is represented by a complex number corresponding to its amplitude and phase, and each complex number of the resulting array of complex numbers is multiplied by a complex correction factor having a phase proportional to (i) the time offset of the corresponding pulse, and to (ii) a test frequency of an array of test frequencies, to form a second array of complex numbers. A Fourier transform of the second array is taken, and the value at the test frequency is copied into a corrected spectrum array. The process is repeated for each test frequency in the array of test frequencies, to generate a complete corrected spectrum array.

20 Claims, 5 Drawing Sheets

(56) References Cited

OTHER PUBLICATIONS

Minden, et al., "A Range-Resolved Doppler Imaging Sensor Based on Fiber Lasers", IEEE Journal of Selected Topics in Quantum Electronics, IEEE Service Center, vol. 3, No. 4, Aug. 1, 1997 (pp. 1080-1086).
International Search Report for corresponding International Application No. PCT/US2017/027493, filed Apr. 13, 2017; International Search Report dated Nov. 21, 2017 and dated Nov. 29, 2017 (5 pgs.).
Written Opinion of the International Searching Authority for corresponding International Application No. PCT/US2017/027493, filed Apr. 13, 2017, Written Opinion of the International Searching Authority dated Nov. 29, 2017 (7 pgs.).

\* cited by examiner

NON-UNIFORM SAMPLING FOR UNAMBIGUOUS DOPPLER MEASUREMENT

BACKGROUND

1. Field

One or more aspects of embodiments according to the present invention relate to laser detection and ranging systems, and more particularly to a method for removing Doppler ambiguity in such a system.

2. Description of Related Art

A laser detection and ranging system may transmit a sequence of short pulses of light, and detect return pulses that are formed when the transmitted pulses reflect from a target. Such a system may be affected by Doppler ambiguity, i.e., from an inability to unambiguously determine the range rate of the target from the return pulses. Measuring range rate unambiguously may be useful in various commercial and military applications of laser detection and ranging systems.

Thus, there is a need for a method for unambiguous Doppler measurement in a laser detection and ranging system.

SUMMARY

Aspects of embodiments of the present disclosure are directed toward a method for removing Doppler ambiguity in a ladar system. The time of each pulse of a sequence of transmitted pulses is offset from that of a uniform sequence of pulses. Each received pulse is represented by a complex number corresponding to its amplitude and phase, and each complex number of the resulting array of complex numbers is multiplied by a complex correction factor having a phase proportional to (i) the time offset of the corresponding pulse, and (ii) a test frequency of an array of test frequencies, to form a second array of complex numbers. A Fourier transform of the second array is taken, and the value at the test frequency is copied into a corrected spectrum array. The process is repeated for each test frequency in the array of test frequencies, to generate a complete corrected spectrum array.

According to an embodiment of the present invention there is provided a method for operating a light detection and ranging (ladar) system, the method including: transmitting, by a laser transmitter, a sequence of laser pulses, each pulse being offset, by a respective time offset of a sequence of time offsets, from a corresponding one of a sequence of uniformly spaced time points; receiving a sequence of pulses, each received pulse being a reflection of a corresponding pulse of the sequence of transmitted laser pulses from a target; forming a first array of complex numbers, each corresponding to an amplitude and phase of a received pulse of the sequence of received pulses; and for each of a plurality of uniformly-spaced test frequencies: multiplying each of the complex numbers by a corresponding correction factor, of an array of correction factors, to form a second array of complex numbers; taking a Fourier transform of the second array of complex numbers to form a Fourier array; and copying a selected element of the Fourier array into a corresponding position in a first corrected spectrum array, the selected element being an element at the test frequency.

In one embodiment, each correction factor of the array of correction factors is given by $\exp(-i2\pi f_c \varepsilon_n)$, where $f_c$ is the test frequency, and $\varepsilon_n$ is a time offset of the sequence of time offsets.

In one embodiment, the method includes operating a correlation filter to select the time offset $\varepsilon_n$ from the sequence of time offsets.

In one embodiment, the forming of a first array of complex numbers includes: mixing the laser pulses of the sequence of laser pulses with a signal from a local oscillator to form an intermediate frequency signal; and measuring the amplitude and phase of the intermediate frequency signal; setting the real part of a complex number of the first array of complex numbers to be proportional to a cosine component of the intermediate frequency signal; and setting the imaginary part of the complex number to be proportional to a sine component of the intermediate frequency signal.

In one embodiment, the forming of a first array of complex numbers includes detecting the sequence of received pulses with a Geiger-mode avalanche photodetector.

In one embodiment, the method includes finding a peak in the first corrected spectrum array and calculating a Doppler velocity of the target from a frequency at which the peak is found.

In one embodiment, the method includes using the Doppler velocity to intercept the target.

In one embodiment, the transmitting, by the laser transmitter, of a sequence of laser pulses, includes using a pseudorandom number generator to generate the sequence of time offsets.

In one embodiment, the taking of the Fourier transform of the second array of complex numbers includes taking a fast Fourier transform of the second array of complex numbers.

According to an embodiment of the present invention there is provided a method for operating a light detection and ranging (ladar) system, the method including: receiving a sequence of laser pulses, each received pulse being a reflection of a corresponding pulse of the sequence of transmitted laser pulses from a target, each of the transmitted pulses being offset, by a respective time offset of a sequence of time offsets, from a corresponding one of a sequence of uniformly spaced time points; forming a first array of complex numbers, each corresponding to an amplitude and phase of a received pulse of the sequence of received pulses; and for each of a plurality of uniformly-spaced test frequencies: forming a convolution of: a Fourier transform of an array of correction factors; and a Fourier transform of the first array of complex numbers, to form a first Fourier array; and copying a selected element of the first Fourier array into a corresponding position in a first corrected spectrum array, the selected element being an element at the test frequency.

In one embodiment, each correction factor of the array of correction factors is given by $\exp(-i2\pi f_c \varepsilon_n)$, where $f_c$ is the test frequency, and $\varepsilon_n$ is a time offset of the sequence of time offsets.

In one embodiment, the method includes operating a correlation filter to select the time offset $\varepsilon_n$ from the sequence of time offsets.

In one embodiment, the forming of a first array of complex numbers includes: mixing the laser pulses of the sequence of laser pulses with a signal from a local oscillator to form an intermediate frequency signal; and measuring the amplitude and phase of the intermediate frequency signal; setting the real part of a complex number of the first array of complex numbers to be proportional to a cosine component of the intermediate frequency signal; and setting the imaginary part of the complex number to be proportional to a sine component of the intermediate frequency signal.

In one embodiment, the forming of a first array of complex numbers includes detecting the sequence of received pulses with a Geiger-mode avalanche photodetector.

In one embodiment, the method includes finding a peak in the first corrected spectrum array and calculating a Doppler velocity of the target from a frequency at which the peak is found.

In one embodiment, the method includes using the Doppler velocity to intercept the target.

In one embodiment, the method further includes transmitting, by a laser transmitter, the sequence of laser pulses, and the transmitting, by the laser transmitter, of a sequence of laser pulses, includes using a pseudorandom number generator to generate the sequence of time offsets.

In one embodiment, the forming of the convolution of: the Fourier transform of the array of correction factors; and the Fourier transform of the first array of complex numbers includes forming the convolution of: the fast Fourier transform of the array of correction factors; and the fast Fourier transform of the first array of complex numbers.

According to an embodiment of the present invention there is provided a ladar system, including: a transmitter; a receiver; and a processing unit, the transmitter being configured to transmit a sequence of laser pulses, each pulse being offset, by a respective time offset of a sequence of time offsets, from a corresponding one of a sequence of uniformly spaced time points, the receiver being configured to receive a sequence of pulses, each received pulse being a reflection of a corresponding pulse of the sequence of transmitted laser pulses from a target, the processing unit being configured to: form a first array of complex numbers, each corresponding to an amplitude and phase of a received pulse of the sequence of received pulses; and for each of a plurality of uniformly-spaced test frequencies: multiply each of the complex numbers by a corresponding correction factor, of an array of correction factors, to form a second array of complex numbers; take a Fourier transform of the second array of complex numbers to form a Fourier array; and copy a selected element of the Fourier array into a corresponding position in a first corrected spectrum array, the selected element being an element at the test frequency.

In one embodiment, each correction factor of the array of correction factors is given by $\exp(-i2\pi f_c \varepsilon_n)$, wherein: $f_c$ is the test frequency, and $\varepsilon_n$ is a time offset of the sequence of time offsets.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a method of non-uniform sampling for unambiguous Doppler measurement provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1A:
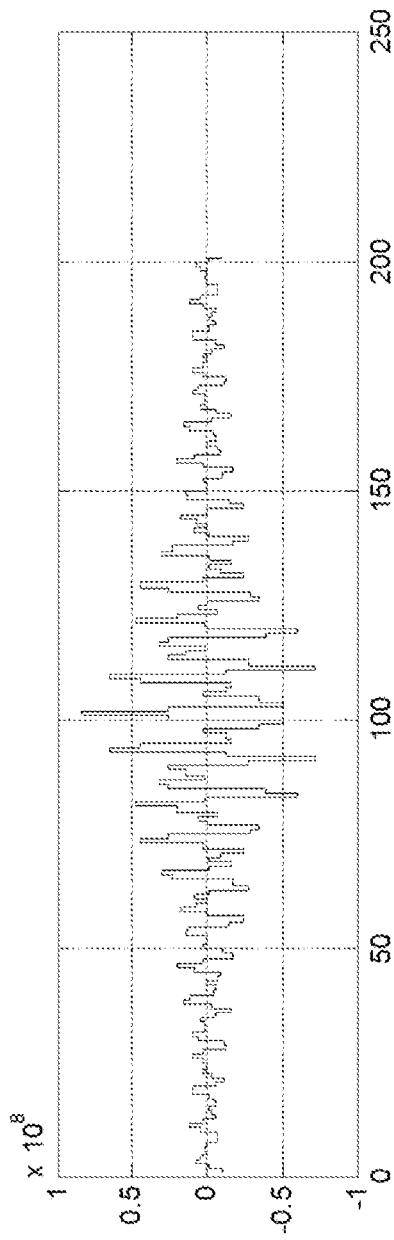
FIG. 1A is graph of a correlation filter output of an ambiguous pulse train, according to an embodiment of the present invention.
Figure 1B:
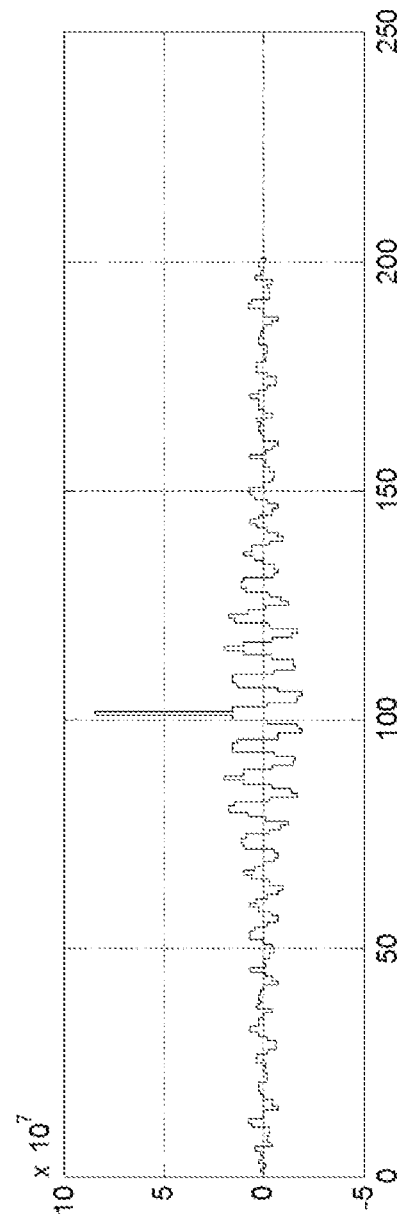
FIG. 1B is graph of a correlation filter output of an unambiguous pseudo-random pulse train, according to an embodiment of the present invention.

A photon counting ladar waveform may include a repeating train of short pulses to obtain high range and Doppler resolution capability. The repeating waveform may however create a range ambiguity determined by the period of the waveform, $T_s$, as well as a Doppler ambiguity determined by the pulse repetition frequency (PRF) of the waveform which is $1/T_s$. The range ambiguity may be given by: $R_{amb}=c/2*T_s$, where c is the speed of light. Referring to FIGS. 1A and 1B, to make an unambiguous range measurement, the pulse spacing may be randomized into a set or predetermined sequence (or the sequence may be measured during transmission) yielding non-uniform sampling, and the return signal may be processed with a cross-correlation filter, to generate, e.g., the output of FIG. 1B, and to extract a unique range result. FIG. 1A shows a filter output for a case in which the pulse spacing has a small degree of randomization (or no randomization). As can be seen from FIGS. 1A and 1B, in the absence of randomization of the pulse train, the output of the correlation filter may have a plurality of peaks of similar amplitude, which may hamper the identification of the peak corresponding to the correct range.

The Doppler velocity ambiguity may be given by the following formula:

$$V_{amb}=\lambda/2*PRF=\lambda/2*(1/T_s)$$

In embodiments of the present invention, non-uniform sampling may also yield an unambiguous Doppler velocity measurement. According to a theory of uniform sampling formalized by Shannon and Whittaker in 1949, only a signal that contains frequencies below half the sampling rate (e.g., PRF) can be fully reconstructed; frequency components above half the sampling rate (also known as the Nyquist limit) will be folded and "aliased" or mixed into the lower half components. Accordingly, a band-limited signal will reappear at zero after being offset by the PRF; this mechanism may cause a Doppler ambiguity.

A uniform sampled signal that is missing some data samples may become a non-uniformly sampled signal. For such a non-uniformly sampled signal, if the total number of samples (pulses) used is the same as the Nyquist-compliant uniform sampled data set, then the image may be reconstructed. In some embodiments, the velocity ambiguity is removed, to determine a target's radial velocity (i.e., range rate) in absolute scale, without a need to reconstruct the signal.

To derive a method for removing the Doppler ambiguity, it is assumed that a ladar return signal is narrow-band, i.e., that the frequency spread is small compared to the carrier or center frequency. The signal is written:

$$s(t)=s_{env}(t)\cdot\exp(i2\pi f_0 t) \qquad (1)$$

where $S_{env}(t)$ is the envelope of the carrier.

If the signal is sampled uniformly at an interval $\Delta t$, the following expression may hold:

$$s(t) = s_{env}(t) \cdot \sum_n \delta(t - n\Delta t) \cdot \exp(i2\pi f_0 \cdot (t - n\Delta t)) \qquad (2)$$

Using the Fourier Transform definition of $X(f)=\int_{-\infty}^{\infty} x(t) \cdot e^{-i2\pi f t} dt$, this may be rewritten as:

$$S(f) = \sum_n s_{env}(n\Delta t) \cdot \exp(i2\pi f_0 \cdot (n\Delta t)) \cdot \exp(-i2\pi f \cdot n\Delta t) \qquad (3)$$

This sum is nonzero when $f \sim f_0 + m/\Delta t$, hence the ambiguity at the PRF=$1/\Delta t$.

Figure 2:
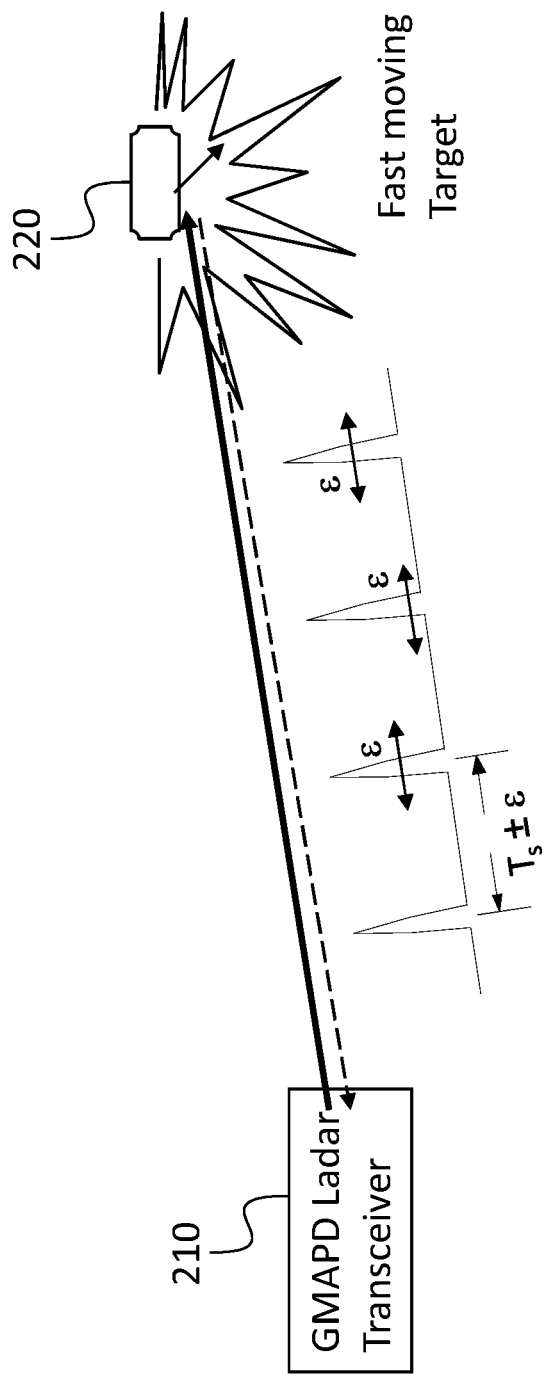
FIG. 2 is a schematic diagram of a ladar transceiver interacting with a target, according to an embodiment of the present invention.

Referring to FIG. 2, in one embodiment, randomizing the pulse position of pulses transmitted by a ladar transceiver 210 (and reflected by a target 220) may remove the range and Doppler ambiguity. A pseudo-random sampling period may be exploited in the time domain by using a correlation filter, and it also may cause a phase error of $\phi_{en}=2\pi f_0 \varepsilon_n$ that may be exploited in the frequency domain, to remove the Doppler ambiguity.

Non-uniform sampling may correspond to adding a random timing jitter, $\varepsilon$, to what would otherwise be uniform sampling at a PRF with period $\Delta t$. The sampled signal may then be:

$$s(t) = s_{env}(t) \cdot \sum_n \delta(t - n\Delta t - \varepsilon_n) \cdot \exp(i2\pi f_0 \cdot (t - n\Delta t - \varepsilon_n)) \qquad (4)$$

where $\varepsilon_n$ is a new random realization for each n. Taking the Fourier transform as if s(t) was uniformly sampled results in:

$$S(f) = \sum_n s_{env}(n\Delta t + \varepsilon_n) \cdot \exp(i2\pi f_0 \cdot (n\Delta t + \varepsilon_n)) \cdot \exp(-i2\pi f \cdot n\Delta t) \qquad (5)$$

which is similar to Equation (4), except that the carrier signal appears to have a phase error of $\phi_{en}=2\pi f_0 \varepsilon_n$. At low frequencies the phase error may be small and have little effect, but at higher frequencies, the random phase may cause the signal to disperse or nearly cancel out. Rewriting the signal spectrum of Equation (5) using the phase error term explicitly results in:

$$S(f) = \sum_n s_c(n\Delta t + \varepsilon_n) \cdot \exp(i2\pi f_0 \cdot n\Delta t) \cdot \exp(-i2\pi f \cdot n\Delta t) \cdot \exp(i\phi_{en}) \qquad (6)$$

Figure 3:
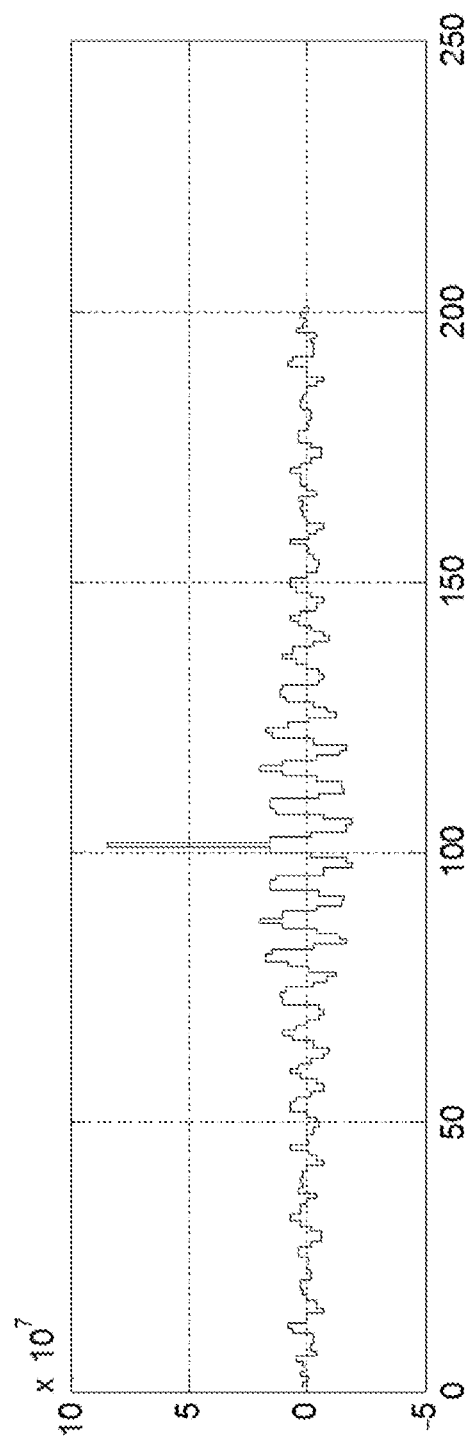
FIG. 3 is graph of a correlation filter output of an unambiguous pseudo-random pulse train, according to an embodiment of the present invention.

The phasing of the Fourier series may then be corrected, by multiplying each term by a phase correction $\exp(-i\phi_{en})$. This would correct the carrier phase error (which is most sensitive to the introduction of the timing jitter) but not the envelope, which may have more information on the target dynamics. The corrected spectrum, $S_c(f)$ can then be written, $$S_c(f)=FT\{S(t)\cdot\exp(-i2\pi f_c \varepsilon_n)\} \qquad (7)$$

where FT{ } stands for the Fourier Transform operator, and where Equation (7) may be corrected when $f=f_c$ (and may not be corrected at other frequencies). In one embodiment, the operation is performed for each frequency in the spectrum of interest, by iterating over a sequence of "test frequencies" that may be, for example, uniformly distributed over the frequency range of interest. In order to perform this correction the phase correction terms may be lined up with the random pulse sequence; this may be done by measuring the center range of the target using a correlation filter, e.g., a correlation filter generating an output such as that shown in FIG. 3 (and also in FIG. 1B), for an unambiguous pseudo-random pulse train.

Since a multiplication in the time domain corresponds to a convolution in the frequency domain, the phase correction may also be performed in the following manner:

$$S_c(f) = S(f) \otimes FT\left\{\sum_n \exp(-i2\pi f_c \varepsilon_n)\right\} = S(f) \otimes \text{Corr}(f) \qquad (8)$$

where $\otimes$ is the convolution operator, and Corr(f) is the Fourier transform of the correction signal.

Again, the correction may occur only at $f=f_c$, and accordingly, this calculation may be performed for each frequency f of interest (i.e., for each test frequency) in the spectrum.

A time alignment that translates into a phase offset may remain, for all the terms. A range estimate may be formed by rotating the phase offset to find a maximum of the peak value.

Figures 4A, 4B:
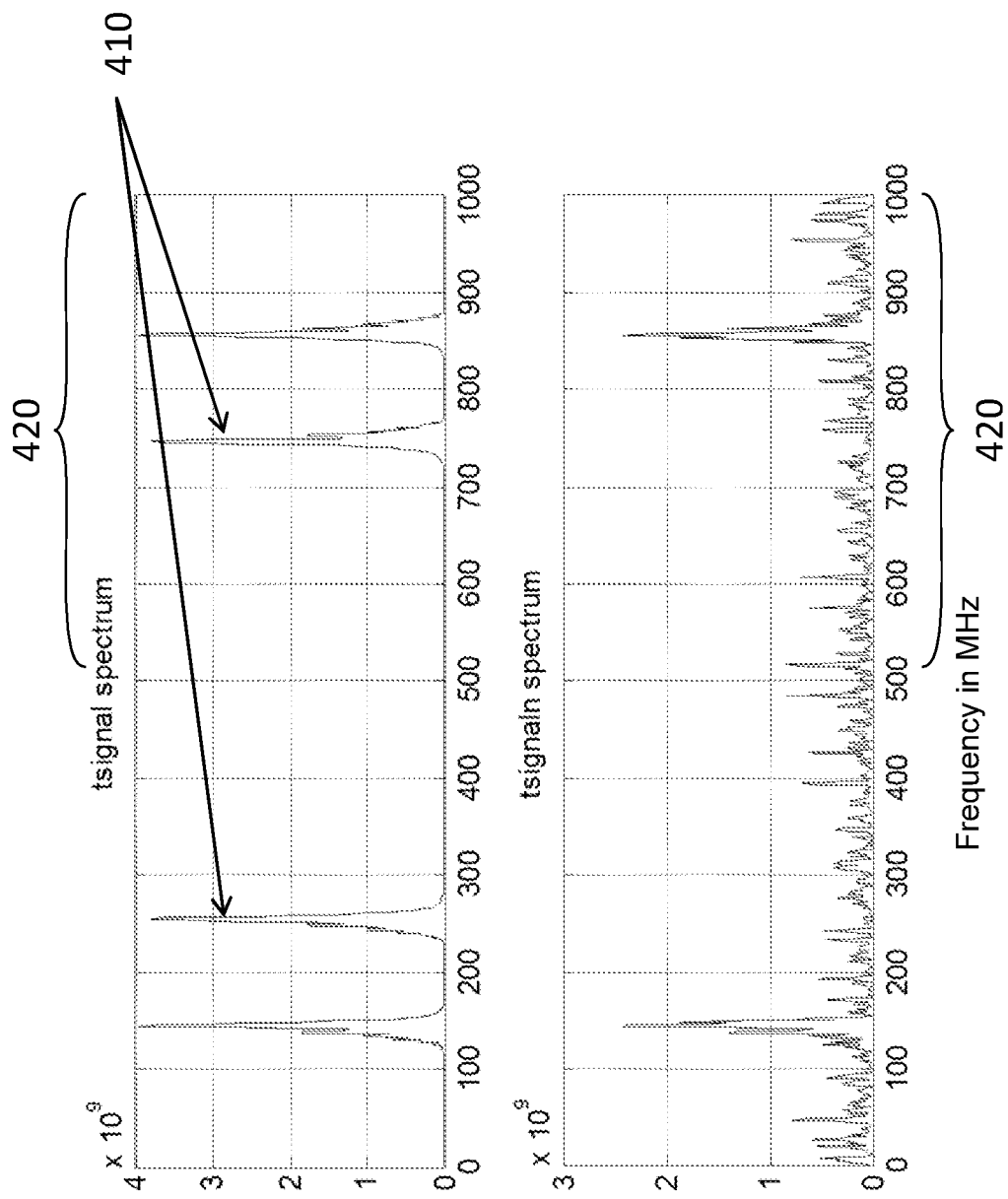
FIG. 4A is a Doppler spectrum with uniform sampling (or with non-uniform sampling with a small non-uniformity), according to an embodiment of the present invention.
FIG. 4B is a Doppler spectrum with non-uniform sampling, according to an embodiment of the present invention.

For example, referring to FIGS. 4A and 4B, if two signals are present, one centered around 125 MHz and a second at 1,250 MHz, and if the sampling rate is 1 GHz, jittered with a timing jitter having a normal random distribution with $\alpha=1$ ns, the Fourier transform with uniform sampling (or with small timing jitter) may be that shown in FIG. 4A. The Fourier transform shows peaks 410 corresponding to ambiguous high frequencies folded back into the baseband. In FIG. 4B, by contrast, the ambiguous high frequencies that were mapped to low frequencies do not appear because the phase error is too large to allow reconstruction from the sum series. Negative frequencies 420 appear on the right of FIGS. 4A and 4B as a result of the process of forming a fast Fourier transform. In some embodiments, the timing jitter introduces a time offset that is calculated by a pseudorandom number generator, e.g., a pseudorandom number generator generating numbers that are uniformly distributed over the interval $[-T_0, T_0]$ (or, in another embodiment, normally distributed with $\alpha=T_0$), where $T_0$ is a jitter amplitude equal to, for example, $T_s/10$, $T_s/4$, $T_s/2$, or $T_s$.

The total signal spectrum may be considered to be folded into a single Nyquist window, into which all the signals of higher frequency are mapped. However, using random sampling may cause phase errors that disperse the signal energy across the spectrum. This may be corrected one frequency at a time, making it possible to "unfold" the single Nyquist window back into a wider spectrum. This in turn may make it possible to determine the absolute frequency regions from which the signal originated.

In some embodiments, as described above, adding a random distribution of the ladar pulses that interrogate a target makes it possible to determine simultaneously both its center of mass range and Doppler in an absolute scale, rather than being limited by the Nyquist limit to the pulse PRF. This may reduce the measurement timeline because both range and Doppler can be extracted from the same single transmission/receipt waveform. This approach may greatly simplify the hardware because it may be unnecessary to boost the transmitter and receiver PRF to increase the ambiguity window to include an unknown target Doppler shift. Because only the center-of-mass phase error is corrected, the actual time domain signal may not be an accurate reproduction of the original; such accurate reproduction may not be necessary, however, and the Doppler ambiguity may be removed without it.

Once the range and Doppler of the target have been measured, the range and Dopper information may, for example, be displayed to an operator on a display, or may be used to intercept the target, e.g., to rendezvous with the target, or to deliver a projectile or a warhead to the target.

In one embodiment, processing is performed according to the MATLAB™ code shown in Listing 1.

Listing 1

```
1    %Program to show how to use a non perdioc sample FT
2    %and determine is the Nyquist ambiguity still exists in this domain
3
4    echo off
5    clear all
6    hr=5;
7    Tmax=1000; %ns
8    df=1/Tmax;
9    dt=1; %ns
10   time=(1:dt:Tmax);
11   timehr=(1:dt/hr:Tmax); % use a high res version to see what truth looks like
12   jitter=randn(size(time)).*1; %the large the jitter, the narrower the filter
13   % jitter=(rand(size(time))-0.5)*2; %the large the jitter, the narrower the filter
14   tjitter=time+jitter;
15   ithr=max(size(timehr));
16
17   mask(1:Tmax/2)=ones(1,Tmax/2);
18   mask(Tmax/2+1:Tmax)=zeros(1,Tmax/2);
19   maskhr(1:ithr/2)=ones(1,ithr/2);
20   maskhr(ithr/2+1:ithr)=zeros(1,ithr/2);
21   N=1;
22   sfreq=[.1 .12 .4 .71 .72 1.23 1.25 1.55 1.52 2.33];
23   % selected frequncies that don't fold over other ones
24
25   tsignal=0; tsignaln=0; tsignalhr=0; %initialize
26   mchoice=2;
27
28   switch mchoice
29   case 1 %series of tones
30   for freq=sfreq
31   ramp=sin(freq*5)+3; %add a modulation to the size of the peaks
32
33   %create the 3 signals
34   tsignal=tsignal+(exp(i*2*pi*freq*time))*ramp.*mask;
35   tsignaln=tsignaln +(exp(i*2*pi*freq*tjitter))*ramp.*mask;
36   tsignalhr=tsignalhr+(exp(i*2*pi*freq*timehr))*ramp.*maskhr;
37
38   end
39
40   case 2 %long chirp
41   fslope=(sfreq(5)-sfreq(4))/(Tmax/2).*3;
42   tsignal=time.*(exp(i*2*pi*(sfreq(6).*time+fslope/2*time.^2))).*mask;
43   tsignaln=tjitter.*(exp(i*2*pi*(sfreq(6).*tjitter+fslope/2*tjitter.^2))).*mask;
44   tsignalhr=timehr.*(exp(i*2*pi*(sfreq(6).*timehr+fslope/2*timehr.^2))).*maskhr;
45   %add a second chirp at lower freq
46   tsignal=tsignal+time.*(exp(i*2*pi*(sfreq(2).*time+fslope/2*time.^2))).*mask;
47   tsignaln=tsignaln+tjitter.*(exp(i*2*pi*(sfreq(2).*tjitter+fslope/2*tjitter.^2))).*mask;
48   tsignalhr=tsignalhr+timehr.*(exp(i*2*pi*(sfreq(2).*timehr+fslope/2*timehr.^2))).*maskhr;
49
50   end
51   % Look at the spectrum of the 3 signals
52   ispect=fft(tsignal);
53   ispectn=fft(tsignaln);
54   ispecthr=fft(tsignalhr);
55
56   figure(1)
57   subplot(4,1,1), plot(abs(ispect).^2), grid on;
58   title('tsignal spectrum')
59   subplot(4,1,2), plot(abs(ispectn).^2), grid on;
60   title('tsignaln spectrum')
61   subplot(4,1,3), plot(abs(ispecthr).^2), grid on;
```

-continued

Listing 1

```
62      title('tsignalhr spectrum')
63
64      %Now I need to scan the filter to recreate the hires signal from the low
65      %res random sampled one)
66
67      %best way to do this is to scan the spectrum with the correction array
68      %and capture the intensity at the center only
69      fs=0:df:2.5; % 2.5 is above the highest frequency in our signal
70      fn=1/(2*dt);
71      n=(fs−mod(fs,fn))/fn;
72      f2=mod(fs,fn).*(floor(n/2)==n/2);
73      f2=f2+(fn−mod(fs,fn)).*(floor(n/2)~= n/2); %Create the folded frequency
74      rindex=floor(f2./df+1);
75      findex=0:999;
76      index1=1;
77      cspect=zeros(size(ispecthr)); %allocate the size of the array
78      icspect=zeros(size(ispecthr)); %allocate the size of the array
79      icspect2=zeros(size(ispecthr)); %allocate the size of the array
80      for freq=fs
81      tracer=zeros(size(ispectn));
82      icor=exp(−i*2*pi*freq*jitter); %correction due to the time shift
83      ctsignaln=tsignaln.*icor; % signal with speudo random sample
84      itspectn=fft(ctsignaln);
85      spn1=fft(tsignaln); %Want to check that if we use convolution, we don't need to line up
the time domain correction
86      spn2=fft(icor)*exp(i*0*pi/10); %%multiply by a phasor to see how sensitive it is
87      icspn=conv(fftshift(spn1),fftshift(spn2));
88      %tspectn=abs(fft(ctsignaln+conj(ctsignaln))).^2;
89      kindex=min(rindex(index1),numel(itspectn));
90
91      %make sure we dont go over the limit
92      icspect(index1+2)=itspectn(kindex); % want to recreate the complex spectrum
93      icspect(numel(icspect)−index1−2)=itspectn(kindex); % the other half of the spectrum
94
95      offsetIndex=floor(length(icspn)/2);
96      icspect2(index1)=icspn(offsetIndex+kindex); % want to recreate the complex spectrum
97      icspect2(numel(icspect2)−index1)=icspn(offsetIndex+kindex); % the other half of the
spectrum
98
99      %cspect(index1)=tspectn(kindex);
100     tracer(kindex)=itspectn(kindex);
101     figure(2)
102     % %subplot(2,1,1), plot(findex,itspectn,findex,tracer, 'circle'), grid on;
103     % if index 1==1
104     %    xmin=min(findex); xmax=max(findex);
105     %    ymin=min(itspectn); ymax=max(itspectn);
106     % end
107     %
108     % subplot(2,1,1), plot(findex,itspectn,'—',findex,tracer,'s'), grid on; axis([xmin xmax ymin
ymax]);
109     % subplot(2,1,2), plot(cspect), grid on;
110
111
112     index1=index1+1;
113     end
114
115     thresh2=max(real(2*icspect).^2)/4;
116     mask2 = real(2*icspect).^2 > thresh2; %Create a gate showing when good signal is
available
117     % icspect=icspect.*mask2;
118     ctsignal=ifft(icspect);
119     figure(1)
120     % subplot(5,1,4), plot(cspect), grid on;
121     % title('Corected spectrum')
122     % subplot(5,1,5), plot((icspect+conj(icspect)).^2), grid on;
123     subplot(4,1,3), plot(abs(icspect2).^2), grid on;
124     title('Convoluted Corrected spectrum')
125     subplot(4,1,4), plot(abs(icspect).^2), grid on;
126     title('Real Corrected spectrum')
127
128
129     figure(4)
130     subplot(2,1,1),plot(unwrap(angle(ispecthr))), grid on;
131     title('Angle for hr')
132     subplot(2,1,2),plot(unwrap(angle(icspect))), grid on;
133     title('Angle for Corrected Spectrum')
134
```

-continued

Listing 1

```
135
136    figure(3)
137    subplot(4,1,1), plot(time,tsignal+conj(tsignal)), grid on;
138    title('tsignal')
139    subplot(4,1,2), plot(time,tsignaln+conj(tsignaln)), grid on;
140    title('tsignaln')
141    subplot(4,1,3), plot(timehr,tsignalhr+conj(tsignalhr)), grid on;
142    title('tsignalhr')
143    subplot(4,1,4), plot(timehr,real(ctsignal)), grid on;
144    title('Corrected ctsignal')
145
146    figure(5)
147    plot(xcorr(real(tsignaln)))
148    title('Autocorrelation of Random Sampled Signal')
```

In the code of Listing 1, Equation (7) is evaluated at line 84, and Equation (8) is evaluated at line 87. The selection of the value (from the output array generated by Equation (7) or Equation (8)) at the test frequency is performed at lines 92 and 93 for the result generated by line 84, and at lines 96 and 97 for the results generated by 87.

Figure 5:
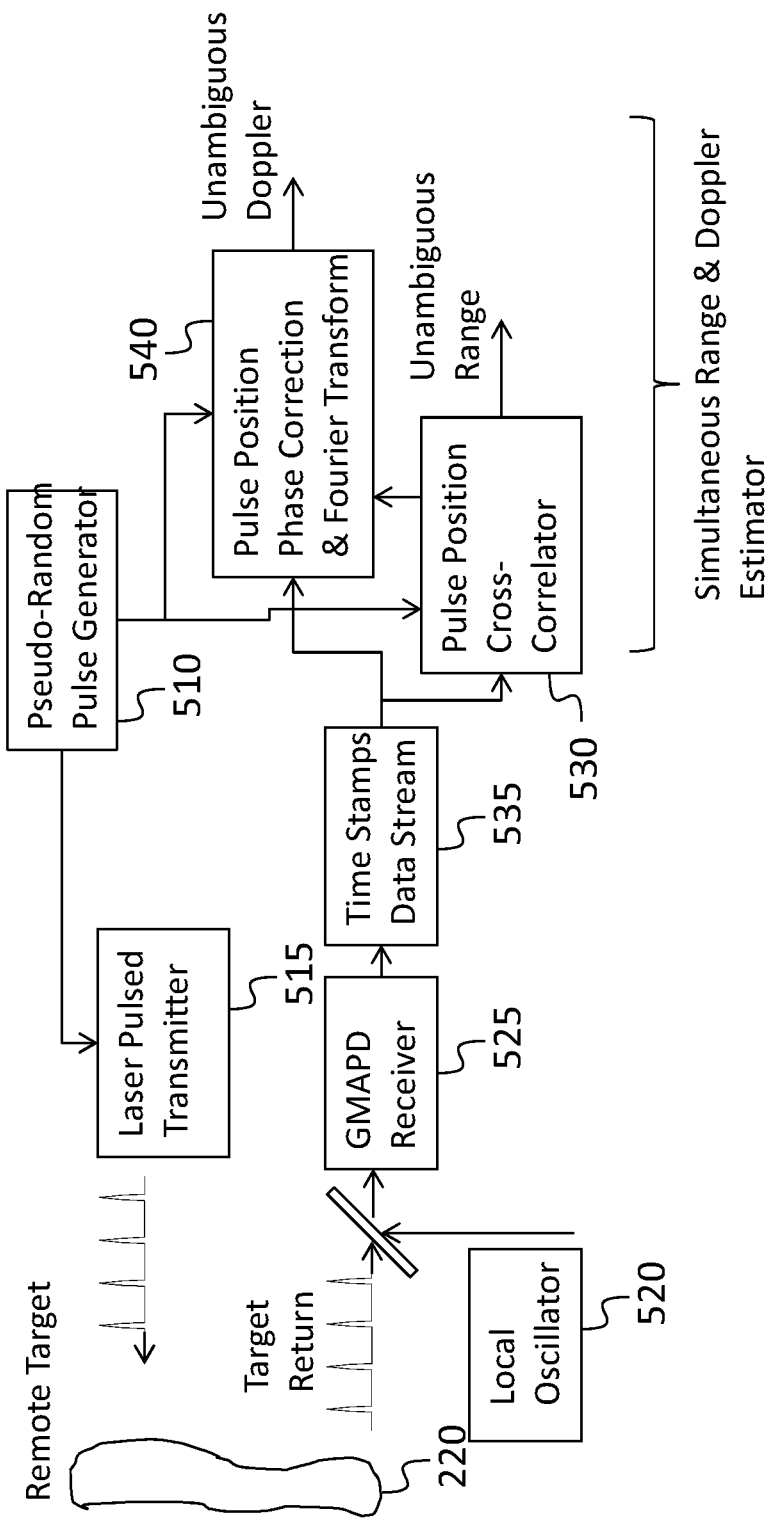
FIG. 5 is a hybrid schematic and block diagram of a ladar system, according to an embodiment of the present invention.

FIG. 5 is a hybrid schematic and block diagram of a ladar system, according to an embodiment of the present invention. Laser pulses are transmitted with timing jitter (i.e., each pulse having a time offset relative to a uniform sequence of pulses). The time offsets are generated by a pseudorandom pulse generator 510, and the pulses are then transmitted, with corresponding respective time offsets, by a laser transmitter 515. The pulses are reflected from the target 220 and, upon being received by the system, they are mixed with a signal from a local oscillator 520. This mixing may be accomplished, for example, by combining the pulses linearly with the signal from the local oscillator 520 (the combining being done, e.g., using a beam combiner), and detecting the resulting combined signal with a square-law detector such as a Geiger-mode avalanche photodetector (GMAPD) 525. Photons detected by the GMAPD 525 may be time-stamped, and the sequence of time stamps may form a data stream of time stamps 535. The data stream of time stamps may be fit with a cosine and a sine to provide an in phase signal and a quadrature phase signal, e.g., represented as a sequence of complex numbers for subsequent processing. A correlation filter, or "pulse position cross-correlator" 530, may be used to match up the time offsets of the received pulses to those of the transmitted pulses (i.e., to estimate the round trip time of flight). The knowledge of the time offset corresponding to each received pulse may then be used to generate a correction factor for each received pulse (e.g., the factor $\exp(-i2\pi f_c \varepsilon_n)$) for use in Equation (7) or in Equation (8). An unambiguous Doppler (i.e., range rate) estimate may then be produced by a pulse position phase correction and Fourier transform block 540.

Computational aspects of methods according to embodiments of the present invention may be performed by one or more processing units. For example, the pulse position phase correction and Fourier transform block 540 may be, or may be implemented in, a processing unit. The term "processing unit" is used herein to include any combination of hardware, firmware, and software, employed to process data or digital signals. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing unit, as used herein, each function is performed either by hardware configured, i.e., hard-wired, to perform that function, or by more general purpose hardware, such as a CPU, configured to execute instructions stored in a non-transitory storage medium. A processing unit may be fabricated on a single printed wiring board (PWB) or distributed over several interconnected PWBs. A processing unit may contain other processing units; for example a processing unit may include two processing units, an FPGA and a CPU, interconnected on a PWB.

Although limited embodiments of a method of non-uniform sampling for unambiguous Doppler measurement have been specifically described and illustrated herein, many modifications and variations will be apparent to those skilled in the art. Accordingly, it is to be understood that a method of non-uniform sampling for unambiguous Doppler measurement employed according to principles of this invention may be embodied other than as specifically described herein. The invention is also defined in the following claims, and equivalents thereof.

What is claimed is:

1. A method for operating a light detection and ranging (ladar) system, the method comprising:
   transmitting, by a laser transmitter, a sequence of laser pulses, each pulse being offset, by a respective time offset of a sequence of time offsets, from a corresponding one of a sequence of uniformly spaced time points;
   receiving a sequence of pulses, each received pulse being a reflection of a corresponding pulse of the sequence of transmitted laser pulses from a target;
   forming a first array of complex numbers, each corresponding to an amplitude and phase of a received pulse of the sequence of received pulses; and
   for each of a plurality of uniformly-spaced test frequencies:
      multiplying each of the complex numbers by a corresponding correction factor, of an array of correction factors, to form a second array of complex numbers;
      taking a Fourier transform of the second array of complex numbers to form a Fourier array; and
      copying a selected element of the Fourier array into a corresponding position in a first corrected spectrum array, the selected element being an element at the test frequency.

2. The method of claim 1, wherein each correction factor of the array of correction factors is given by $\exp(-i2\pi f_c \varepsilon_n)$, wherein:

$f_c$ is the test frequency, and
$\varepsilon_n$ is a time offset of the sequence of time offsets.

3. The method of claim 2, further comprising operating a correlation filter to select the time offset $\varepsilon_n$ from the sequence of time offsets.

4. The method of claim 1, wherein the forming of a first array of complex numbers comprises:
mixing the laser pulses of the sequence of laser pulses with a signal from a local oscillator to form an intermediate frequency signal; and
measuring the amplitude and phase of the intermediate frequency signal;
setting the real part of a complex number of the first array of complex numbers to be proportional to a cosine component of the intermediate frequency signal; and
setting the imaginary part of the complex number to be proportional to a sine component of the intermediate frequency signal.

5. The method of claim 1, wherein the forming of a first array of complex numbers comprises detecting the sequence of received pulses with a Geiger-mode avalanche photodetector.

6. The method of claim 1, further comprising finding a peak in the first corrected spectrum array and calculating a Doppler velocity of the target from a frequency at which the peak is found.

7. The method of claim 6, further comprising using the Doppler velocity to intercept the target.

8. The method of claim 1, wherein the transmitting, by the laser transmitter, of a sequence of laser pulses, comprises using a pseudorandom number generator to generate the sequence of time offsets.

9. The method of claim 1, wherein the taking of the Fourier transform of the second array of complex numbers comprises taking a fast Fourier transform of the second array of complex numbers.

10. A method for operating a light detection and ranging (ladar) system, the method comprising:
receiving a sequence of laser pulses, each received pulse being a reflection of a corresponding pulse of a sequence of transmitted laser pulses from a target, each of the transmitted pulses being offset, by a respective time offset of a sequence of time offsets, from a corresponding one of a sequence of uniformly spaced time points;
forming a first array of complex numbers, each corresponding to an amplitude and phase of a received pulse of the sequence of received pulses; and
for each of a plurality of uniformly-spaced test frequencies:
forming a convolution of:
a Fourier transform of an array of correction factors; and
a Fourier transform of the first array of complex numbers,
to form a first Fourier array; and
copying a selected element of the first Fourier array into a corresponding position in a first corrected spectrum array, the selected element being an element at the test frequency.

11. The method of claim 10, wherein each correction factor of the array of correction factors is given by $\exp(-i2\pi f_c \varepsilon_n)$, wherein:
$f_c$ is the test frequency, and
$\varepsilon_n$ is a time offset of the sequence of time offsets.

12. The method of claim 11, further comprising operating a correlation filter to select the time offset $\varepsilon_n$ from the sequence of time offsets.

13. The method of claim 10, wherein the forming of a first array of complex numbers comprises:
mixing the laser pulses of the sequence of laser pulses with a signal from a local oscillator to form an intermediate frequency signal; and
measuring the amplitude and phase of the intermediate frequency signal;
setting the real part of a complex number of the first array of complex numbers to be proportional to a cosine component of the intermediate frequency signal; and
setting the imaginary part of the complex number to be proportional to a sine component of the intermediate frequency signal.

14. The method of claim 10, wherein the forming of a first array of complex numbers comprises detecting the sequence of received pulses with a Geiger-mode avalanche photodetector.

15. The method of claim 10, further comprising finding a peak in the first corrected spectrum array and calculating a Doppler velocity of the target from a frequency at which the peak is found.

16. The method of claim 15, further comprising using the Doppler velocity to intercept the target.

17. The method of claim 10, further comprising transmitting, by a laser transmitter, the sequence of laser pulses, wherein the transmitting, by the laser transmitter, of the sequence of laser pulses, comprises using a pseudorandom number generator to generate the sequence of time offsets.

18. The method of claim 10, wherein the forming of the convolution of:
the Fourier transform of the array of correction factors; and
the Fourier transform of the first array of complex numbers comprises forming the convolution of:
the fast Fourier transform of the array of correction factors; and
the fast Fourier transform of the first array of complex numbers.

19. A ladar system, comprising:
a transmitter;
a receiver; and
a processing unit,
the transmitter being configured to transmit a sequence of laser pulses, each pulse being offset, by a respective time offset of a sequence of time offsets, from a corresponding one of a sequence of uniformly spaced time points,
the receiver being configured to receive a sequence of pulses, each received pulse being a reflection of a corresponding pulse of the sequence of transmitted laser pulses from a target,
the processing unit being configured to:
form a first array of complex numbers, each corresponding to an amplitude and phase of a received pulse of the sequence of received pulses; and
for each of a plurality of uniformly-spaced test frequencies:
multiply each of the complex numbers by a corresponding correction factor, of an array of correction factors, to form a second array of complex numbers;
take a Fourier transform of the second array of complex numbers to form a Fourier array; and copy a selected element of the Fourier array into a corresponding position in a first corrected spectrum array, the selected element being an element at the test frequency.

20. The system of claim 19, wherein each correction factor of the array of correction factors is given by $\exp(-i2\pi f_c \varepsilon_n)$, wherein:

$f_c$ is the test frequency, and $\varepsilon_n$ is a time offset of the sequence of time offsets.

* * * * *